United States Patent

Nishi

[11] Patent Number: 5,288,970
[45] Date of Patent: Feb. 22, 1994

[54] METHOD OF CONTROLLING TORCH HEIGHT IN PLASMA CUTTING

[75] Inventor: Yozo Nishi, Komatsu, Japan

[73] Assignee: Kabushiki Kaisha Komatsu Seisakusho, Tokyo, Japan

[21] Appl. No.: 941,089

[22] PCT Filed: Apr. 17, 1991

[86] PCT No.: PCT/JP91/00513
§ 371 Date: Oct. 19, 1992
§ 102(e) Date: Oct. 19, 1992

[87] PCT Pub. No.: WO91/16169
PCT Pub. Date: Oct. 31, 1991

[30] Foreign Application Priority Data

Apr. 17, 1990 [JP] Japan ............... 2-102658
Apr. 17, 1990 [JP] Japan ............... 2-102659

[51] Int. Cl.$^5$ .................. B23K 9/00; B23K 10/00
[52] U.S. Cl. .................. 219/121.56; 219/121.44; 219/121.39; 219/121.54; 219/121.59
[58] Field of Search ............... 219/121.39, 121.44, 219/121.59, 121.56, 121.54, 124.03, 121.1

[56] References Cited

U.S. PATENT DOCUMENTS 4,156,125  5/1979  Brown .............. 219/121.56

FOREIGN PATENT DOCUMENTS 0249598  9/1987  Fed. Rep. of Germany ........ 219/121.44

Primary Examiner—Mark H. Paschall
Attorney, Agent, or Firm—Richards, Medlock & Andrews

[57] ABSTRACT

The present invention discloses a method of controlling torch height in plasma cutting arranged to monitor the cutting speed so that the optimum torch height is maintained and an excellent cutting quality is obtained even if the cutting speed changes. To this end, a base metal (2) is cut by a plasma arc (3) while a torch (1) is maintained at an optimum height (hc) from the base metal (2), and arc voltage (Vi) is read several times (i=1 to n) after the arc voltage becomes steady, their mean arc voltage (Vb) is calculated, a cutting speed (Fa) is read at the time of steady cutting, the means arc voltage (Vb) is corrected by this cutting speed (Fa) to obtain a target arc voltage (Vc) and the optimum height (hc) is maintained by this target arc voltage (Vc).

9 Claims, 7 Drawing Sheets

METHOD OF CONTROLLING TORCH HEIGHT IN PLASMA CUTTING

TECHNICAL FIELD

The present invention relates to a method of controlling the height of a torch in plasma cutting, and, more particularly, to a method of maintaining a torch at its optimum torch height by monitoring the cutting speed so as to achieve quality cutting even if the cutting speed changes.

BACKGROUND ART

Hitherto, the plasma cutting machine has been mounted on an XY table or the like and adapted to a method of controlling the torch height in plasma cutting in order to obtain quality cutting, the method being arranged to utilize a fact that "torch height h is in proportion to arc voltage Va" at a predetermined torch movement speed (hereinafter called a "cutting speed") in such a manner that the arc voltage Va isomonitored so that the torch is maintained at its optimum height hc (refer to, for example, DE2706232C3).

Specifically, as shown in FIG. 7, an assumption is made that the arc voltage generated when the torch is positioned at the optimum torch height hc is a target arc voltage Vci (SO), the torch is set at the aforesaid optimum cutting height hc from a base metal (S5), and then the base metal is cut. Furthermore, after the arc voltage Va becomes steady (S6), the arc voltage Va is read (S93), and this arc voltage Va and the aforesaid target arc voltage Vc1 are subjected to a comparison (S10). If $Va > Vc1$, the torch is lowered (S101). If $Va = Vc1$, the existing torch height is retained (S102). If $Va < Vc1$, the torch is moved upwardly (S103). As result, the torch is maintained at its optimum torch height hc.

The aforesaid optimum torch height hc is a value which can be determined predictively by collectively considering various factors such as the thickness and the material of the base metal, the diameter of the nozzle of the torch, the cutting speed, and the torch height. The target arc voltage Vc1 obtained from the optimum height hc has been set into the control system of the subject plasma cutting machine as a fixed value.

Observing the actual cut surface, if the torch height is constant at its optimum, the quality of cutting is also constant (in other words, if the torch height is changed, the quality of cutting deteriorates). With the aforesaid conventional method, the cutting speed is changed at the time of cutting a corner, although an assumption is made that a constant cutting speed is maintained. Accordingly, the optimum torch height is also changed, causing the quality of cutting the corner to deteriorate as described in detail below.

FIG. 8 is a characteristic graph which illustrates the results of measurements of cutting speeds (axis of abscissa) and arc voltages (axis of ordinate) with respect to various torch heights h1 to h5 (h1 < h5). As shown in FIG. 8, an increase in the cutting speed Fa will lower the arc voltage Va (hereinafter called an "in inverse proportion") at each torch height h1 to h5. The reason for this lies in the fact that an increase in the cutting speed causes the main positive point to come closer to the torch.

In a case where the predicted optimum torch height is h1 and the predicted optimum cutting speed is FL, the arc voltage Va is Vc1 (for convenience in description, an assumption is made that the arc voltage Va=the target arc voltage Vc1). If the cutting speed is raised (FL→FH), the arc voltage Va is lowered (Vc1→VL). Since the target arc voltage Vc1 is a fixed value, the aforesaid values are subjected to a comparison, resulting in VL < Vc1. Hence, the torch is raised to height h3. That is, there arises a problem in that the torch height has to be changed because the cutting speed has been changed.

In order to overcome the aforesaid problems experienced with the conventional technology, an object of the present invention is to provide a method of controlling the torch height in plasma cutting which is capable of overcoming the deterioration of cutting quality due to a change in the cutting speed.

SUMMARY OF THE INVENTION

In a first aspect, a method of controlling torch height in plasma cutting according to the present invention comprises the steps of: setting a torch at an optimum cutting height hc from a base metal so that the base metal is cut by using a plasma arc; reading arc voltages Vi several times (i=1 to n) after the arc voltage becomes steady; calculating an average arc voltage Vb of the thus read arc voltages Vi; reading the cutting speed Fa at a steady cutting operation; correcting the average arc voltage Vb by the cutting speed Fa to obtain a target arc voltage Vc; and maintaining the optimum torch height hc in accordance with the target arc voltage Vc.

In a second aspect, the present invention is characterized by a method of controlling torch height in plasma cutting in which the arc voltage at an optimum cutting height hc is set as a target arc voltage Vc1, a torch is set to the optimum cutting height hc from a base metal, the base metal is cut by using a plasma arc, an arc voltage Va is read after the arc voltage becomes steady, and the arc voltage Va and the target arc voltage Vc1 are subjected to a comparison, so that the optimum torch height hc is maintained, the method of controlling torch height in plasma cutting comprising the steps of: reading a cutting speed Fa; and correcting the target arc voltage Vc1 by a changed voltage $\Delta V$ which is determined in accordance with the cutting speed Fa.

In a third aspect, the present invention is characterized by a method of controlling torch height in plasma cutting, comprising the steps of: setting a torch at an optimum cutting height hc from a base metal so that the base metal is cut by using a plasma arc; reading arc voltages Vi several times (i=1 to n) after the arc voltage becomes steady; calculating an average arc voltage Vb of the thus read arc voltages Vi; reading a cutting speed Fa at a steady cutting operation; correcting the average arc voltage Vb by a changed voltage $\Delta V$ which is determined in accordance with the cutting speed Fa to obtain a target arc voltage Vc; then reading the arc voltage Va; subjecting the arc voltage Va and the target arc voltage Vc to a comparison; lowering the torch if $Va > Vc$; retaining the existing torch height if $Va = Vc$; and raising the torch if $Va < Vc$, so that the optimum torch height hc is maintained.

In a fourth aspect, the present invention is characterized by a method of controlling torch height in plasma cutting, comprising the steps of: setting a torch at an optimum cutting height hc from a base metal so that the base metal is cut by using a plasma arc; reading an arc voltage V1 after the arc voltage becomes steady; retroactively reading each arc voltage (Vi where i=2 to n)

to n−1 times so as to calculate an average arc voltage Vb of the read arc voltages; reading a cutting speed F at a steady cutting operation; correcting the average arc voltage Vb by a changed voltage Δv which is determined in accordance with the cutting speed Fa to obtain a target arc voltage Vc; then reading the arc voltage Va; subjecting the arc voltage Va and the target arc voltage Vc to a comparison; lowering the torch if Va>Vc; retaining the torch height if Va=Vc; and raising the torch if Va<Vc, so that the optimum torch height hc is maintained.

In a fifth aspect, the present invention is characterized by a method of controlling torch height in plasma cutting, comprising the steps of: setting a torch at an optimum cutting height hc from a base metal so that the base metal is cut by using a plasma arc; reading an arc voltage V01 and its cutting speed F01 after the arc voltage becomes steady; calculating the arc voltage V01 as a function V11=g(F) of the cutting speed F01; calculating a reference arc voltage Δ10 to be generated at a reference cutting speed F0 individually determined in the function V11; reading each reference arc voltage (V10 where i=2 to n) for each time retroactively stored to the (n-1)th time; calculating their average reference arc voltage Vb0; calculating a function V=g(F), which is a function at the reference cutting speed F0, in accordance with the average reference arc voltage Vb0; reading a cutting speed Fa at a steady cutting operation; calculating an arc voltage in the function V at the cutting speed Fa to obtain a target arc voltage Vc; then reading an arc voltage Va; subjecting the arc voltage Va and the target arc voltage Vc to a comparison; lowering the torch if Va>Vc; keeping the torch height if Va=Vc; and raising the torch if Va<Vc, so that the optimum torch height hc is maintained.

In a sixth aspect, the present invention is characterized by a structure arranged in such a manner that the process of reading the arc voltage (Va) is simultaneously performed in the process of reading the cutting speed (Fa) according to the second, the third, the fourth, and the fifth aspects.

Each of the aforesaid structures is arranged in such a manner that the arc voltage Va is monitored by utilizing the fact that "the torch height is in proportion to the arc voltage at the same cutting speed", and the cutting speed Fa is monitored by utilizing the fact that "the arc voltage Va (that is, the torch height) is substantially in inverse proportion to the cutting speed Fa". As a result, even if the cutting speed Fa has been changed, the optimum torch height hc is maintained. Specifically, the structure is arranged in such a manner that the target arc voltage Vc is corrected by the cutting speed Fa. Therefore, even if the cutting speed has been changed, the optimum torch height hc can be maintained, and hence an excellent cutting quality can be obtained.

BEST MODE FOR CARRYING OUT THE INVENTION

Figure 1:
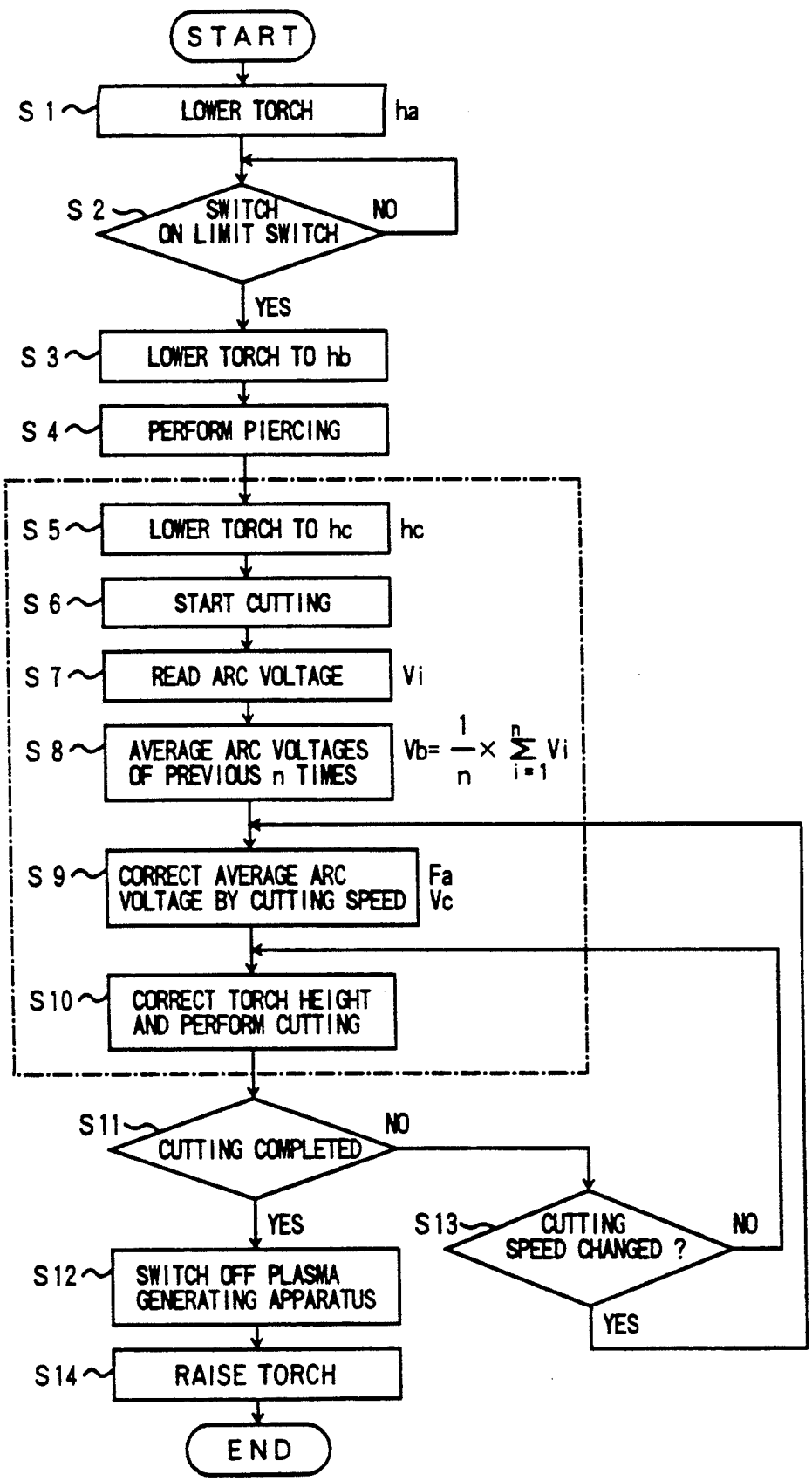
FIG. 1 is a flow chart for use in an embodiment according to a first aspect of the present invention.

Embodiments of the present invention will now be described with reference to FIGS. 1 to 6. Each embodiment is adapted to a plasma cutting robot shown in FIG. 6. The robot 5 comprises a rotary device 52 disposed on a base frame 51, a boom 53 mounted on it, an arm 55 connected to the leading portion of the boom 53 with a pin and arranged to be elevated by a hydraulic actuator 54, a hand 56 joined to the leading portion of the arm 55 in a universal manner, and a controller 57. A torch 1 is fastened to the aforesaid hand 56. Furthermore, a smoke discharge equipment 6 is disposed below the torch 1. A base metal 2 is so placed on a retainer 61 disposed on the smoke discharge equipment that the base metal 2 faces the torch 1.

The plasma cutting operation is performed in such a manner that arc voltage Va generated by a power source 41 between a torch electrode (−) and the base metal 2 (+) is used to convert an operation gas individually supplied to a nozzle disposed at the leading portion of the torch 1 into a plasma arc 3, and the plasma arc 3 and an operating gas individually supplied to the aforesaid nozzle to surround the plasma arc 3 are jetted along a cutting line of the base metal 2 so that the base metal 2 is melted and blown away.

Each of the embodiments is stored by a controller 42 comprising a microcomputer so that arc voltage Va and cutting speed Fa are read, stored and calculated, and the results of the calculations are outputted to a torch drive system of the robot 5. The term "height" for use in torch height h means the "distance" between the torch 1 and the base metal 2 as can be understood from a fact that the aforesaid plasma cutting robot performs the three-dimensional cutting (for example, diagonal cutting, horizontal cutting and vertical cutting) operation. The cutting speed Fa is obtained by reading a set value of the cutting speed stored by the robot controller 57 in the embodiment to be described below. However, it may be read by means of a speed sensor disposed outside individually.

FIG. 1 is a flow chart for use in the first embodiment according to the present invention. The controller lowers the torch 1 to a predetermined height ha from the base metal 2 (S1). When a limit switch disposed adjacent to the torch 1 is switched ON, the controller reads the height ha to obtain a first reference (S2). Then, it lowers the torch 1 to piercing height hb so as to read the height hb which is then made to be a second reference (S3), and then piercing is performed (S4).

The piercing operation is an operation for forming a through hole at a start point in a case where the start point at which the cutting operation is commenced is in the surface of the base metal at a location remote from the edges of the base metal. By performing the piercing operation, molten materials, which cause a double-arc or breakage of the nozzle and the torch to take place, can be blown out. Therefore, the piercing height hb is always made to be higher than the torch height hc to be realized at the time of steady cutting. In another case where the cutting start point is located in the edge portion of the base metal or in the case where a thin base metal is machined, the piercing process step (S4) can be omitted. The aforesaid process steps (S1 to S4) are commonly performed in each of the embodiments relating to the first to fifth aspects, and therefore their descriptions are omitted in the aforesaid embodiments.

The embodiment according to the first aspect is arranged as follows: after the aforesaid preliminary process steps (S1 to S4), the torch 1 is further lowered to the optimum torch height hc (S5) so that the base metal 2 is cut by the plasma arc 3. After the arc voltage becomes steady (S6), arc voltage Vi is read n times, for example ten times (S7), the average arc voltage Vb is calculated (S8), the cutting speed Fa is read at the time of the steady cutting operation, the aforesaid average arc voltage Vb is corrected by the cutting speed Fa so as to make the result of the correction to be the target arc voltage Vc (S9), and the optimum torch height hc is maintained by using the aforesaid target arc voltage Vc (S10). The last two process steps (S9 and S10) are looped until the plasma cutting operation is completed (S13). After the cutting operation has been completed (S11), the plasma arc 3 is turned off (S12), and the torch 1 is moved upwardly (S14). Thus, the overall process is completed. The aforesaid completion process steps (S11 to S14) are commonly performed in the embodiments according to the second to fifth aspects, and therefore their descriptions are omitted in the aforesaid embodiments.

The first aspect of the present invention (also the third embodiment) is suitable to cut a large portion in one base metal.

Figure 2:
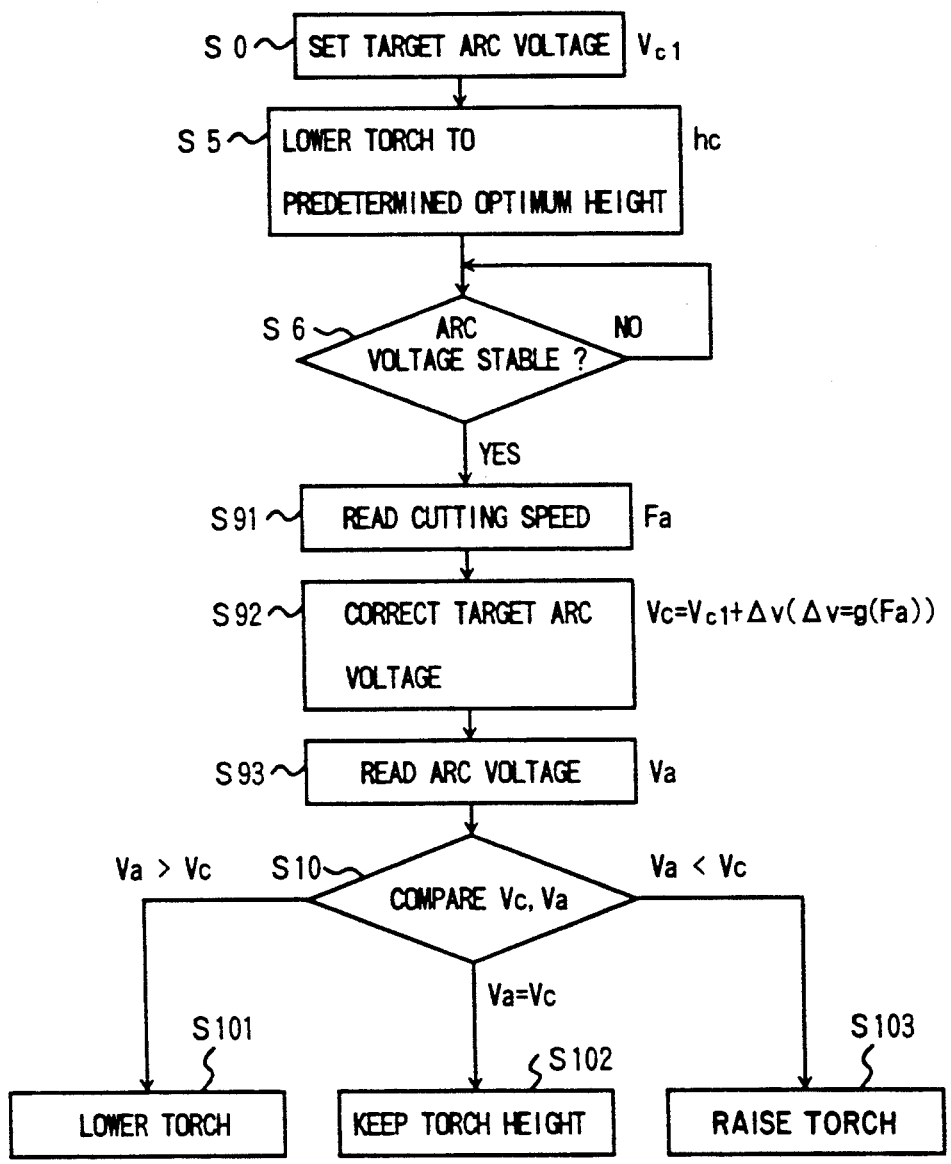
FIG. 2 is flow chart for use in an embodiment according to a second aspect of the present invention.

FIG. 2 is a flow chart for use in an embodiment according to the second aspect of the present invention. First, the arc voltage generated when the torch 1 is at the optimum torch height hc is set as the initial target arc voltage Vc1 (S0), the torch 1 is set to the optitaum cutting height hc from the base metal 2 (S5), and the base metal 2 is cut by using the plasma arc 3. Furthermore, after the arc voltage becomes steady (S6), the cutting speed Fa is inputted (S91), then the aforesaid initial target arc voltage Vc1 is corrected by changed voltage $\Delta V$ obtained in accordance with the cutting speed Fa so as to make the result to be the target arc voltage Vc (S92), the arc voltage Va is read (S93), the arc voltage Va and the target arc voltage Vc are subjected to a comparison (S10). If Va>Vc, the torch 1 is lowered (S101). If Va=Vc, the torch height is retained as it is (S102). If Va<Vc, the torch is moved upwardly (S103), so that the optimum torch height hc is maintained (S10).

In this embodiment, the changed voltage $\Delta V$ is outputted in accordance with the following process. The controller 41 has previously stored the changed voltage $\Delta V$ which depends upon each cutting speed $F_{am}$ at the optimum torch height hc as specific values. The changed voltage $\Delta V$ at the stored cutting speed $F_{am}$ which coincides with the read cutting speed Fa is outputted. Further in detail, the cutting speed Fa is rounded after it has been read so that it is made to serve as the cutting speed $F_{am}$. The process of outputting the changed voltage $\Delta V$ is commonly used in the embodiments according to the third and the fourth aspects of the invention and therefore its description is omitted in these embodiments.

Although the target arc voltage Vc1 is the target arc voltage in the case of the conventional technology as can be seen from its sign, the second aspect of the present invention is preferable and convenient when it is applied to the case where a determination is made that an excessively improved cutting quality is made in the first, and the third to the fifth aspects of the present invention and another determination is made that an unsatisfactory cutting quality is made in the conventional technology because it is corrected by the cutting speed Va. If the optimum torch height hc is further precisely inspected, cutting quality equivalent to that obtainable from the first, and the third to the fifth aspects of the present invention can, of course, be obtained, and therefore, the second aspect is the base of a series of the aspects of the present invention.

Figure 3:
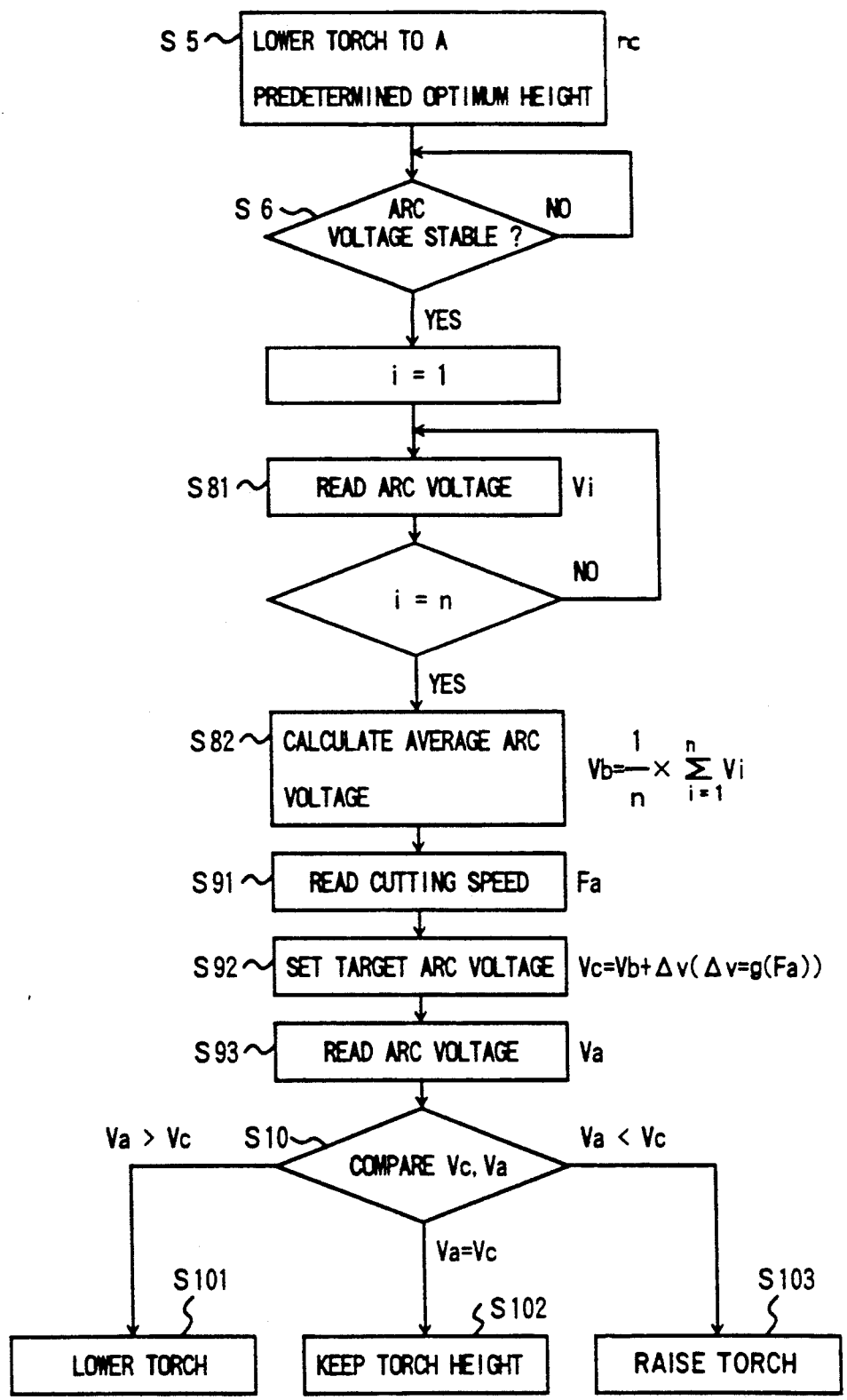
FIG. 3 is a flow chart for use in an embodiment according to a third aspect of the present invention.

FIG. 3 is a flow chart for use in the embodiment according to third aspect of the present invention, wherein the torch 1 is set to a predicted optimum torch height hc from the base metal 2 (S5), the base metal 2 is cut by using the plasma arc 3, and after the arc voltage becomes steady (S6) the arc voltage Vi is read n times, for example ten times (S81), the average arc voltage Vb is calculated (S82), the cutting speed Fa to be realized at the steady cutting operation is read (S91), the aforesaid average arc voltage Vb is corrected by the changed voltage $\Delta V$ in accordance with the cutting speed Fa to obtain the target arc voltage Vc (S92), then the arc voltage Va is read (S93), and the arc voltage Va and the aforesaid target arc voltage Vc are subjected to a comparison (S10). If Va>Vc, the torch 1 is lowered (S101). If Va=Vc, the torch height is retained (S102). If Va<Vc, the torch 1 is moved upwardly (S103). As a result, the predetermined optimum torch height hc is maintained (S10).

Figure 4:
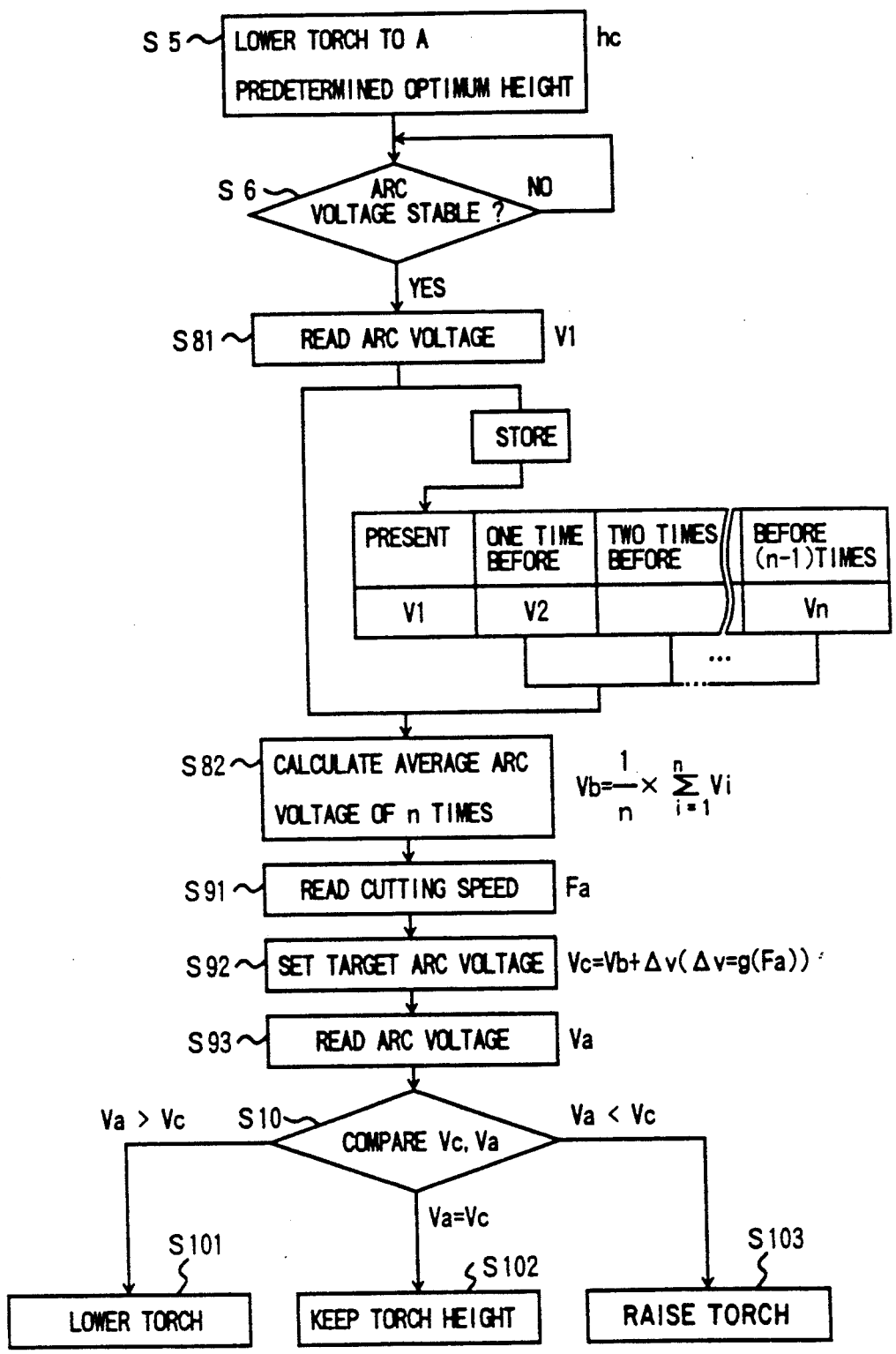
FIG. 4 is a flow chart for use in an embodiment according to fourth aspect of the present invention.
Figure 5:
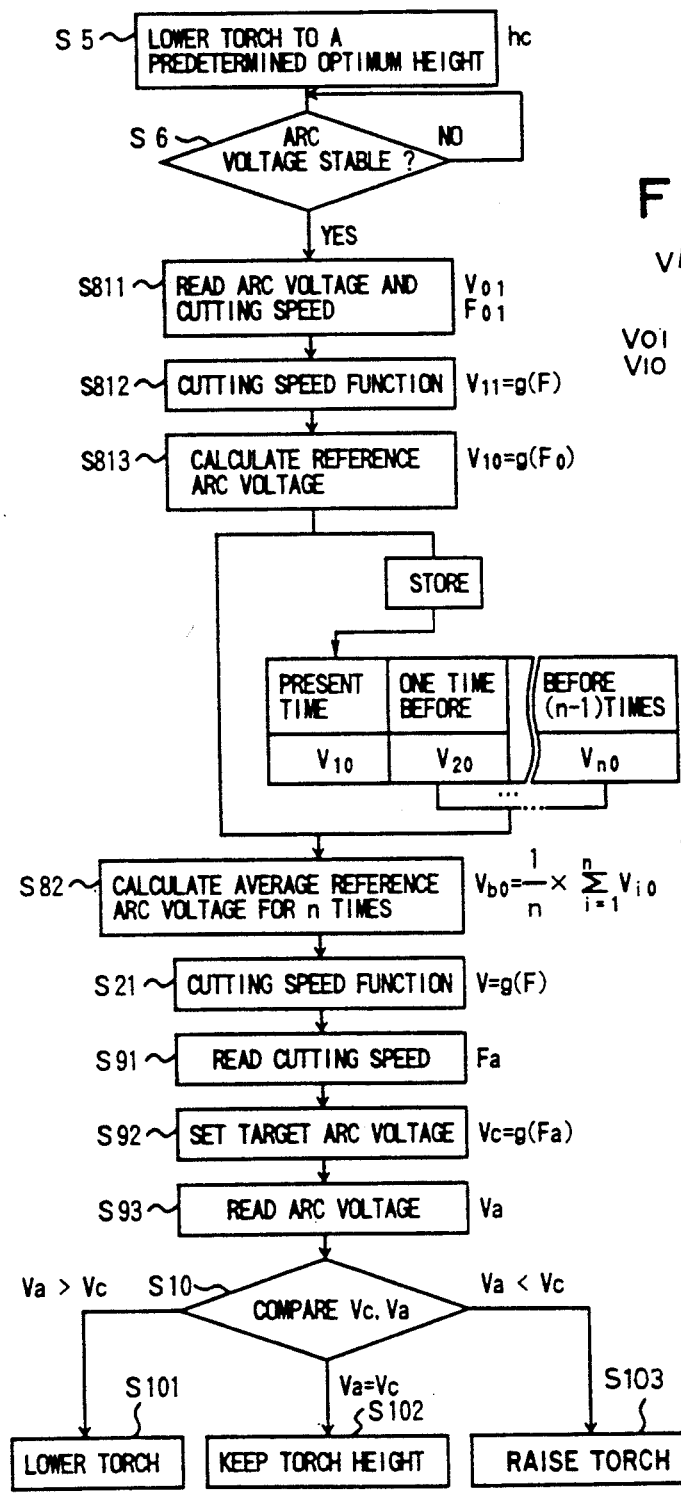
FIG. 5 is a flow chart for use in an embodiment according to fifth aspect of the present invention.
Figure 6:
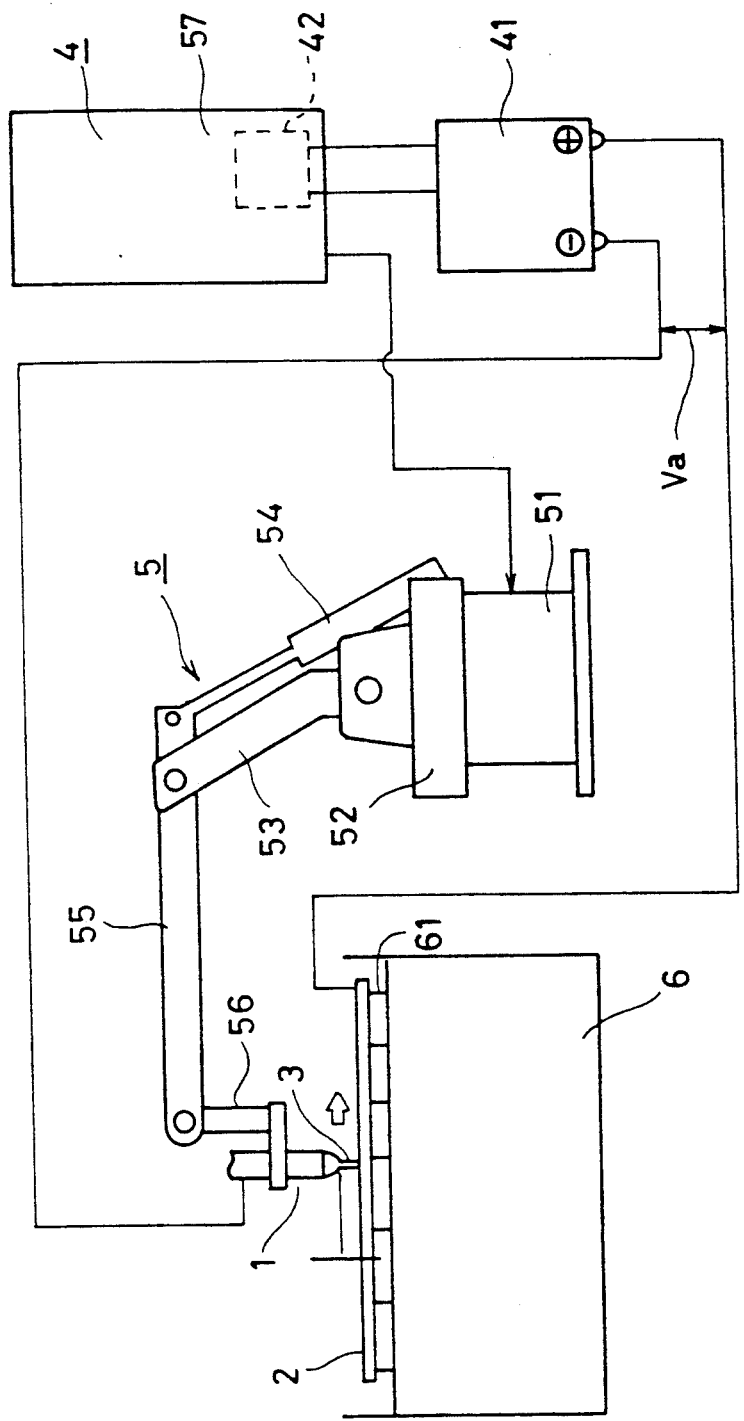
FIG. 6 is a schematic view which illustrates a plasma cutting robot on which the embodiment according to any one of the first fifth aspects of the present invention is mounted.
Figure 7:
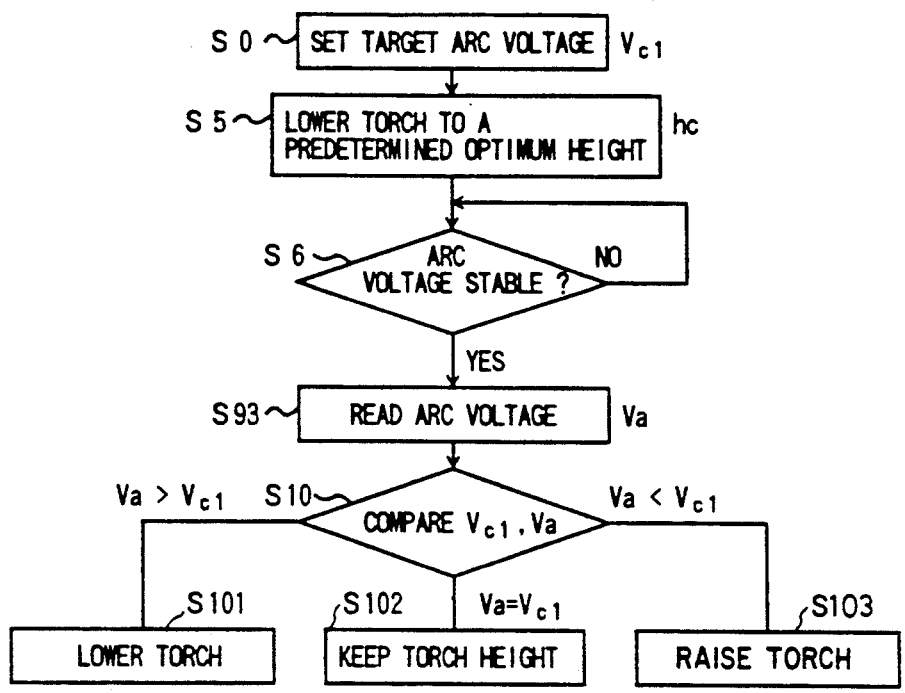
FIG. 7 is a flow chart which illustrates a conventional method.

FIG. 4 is a flow chart for use in the embodiment according to the fourth aspect of the present invention, wherein the torch 1 is set to the predicted optimum height h from the base metal 2 (S5), the base metal 2 is cut by using the plasma arc 3 and, after the arc voltage becomes steady (S6), the arc voltage V1 is read (S81), and each of the arc voltages V2 to V9 to the ninth time is read retroactively and their average arc voltage Vb is calculated (S82), the cutting speed F to be realized at the time of the steady cutting operation is read (S91), the aforesaid average arc voltage Vb is corrected by the changed voltage $\Delta V$ in accordance with the cutting speed F to obtain the target arc voltage Vc (S92), then the arc voltage Va is read (V93), and the arc voltage Va and the aforesaid target arc voltage Vc are subjected to a comparison (S10). If Va>Vc, the torch is lowered (S101). If Va=Vc, the torch height is retained (S102). If Va<Vc, the torch 1 is moved upwardly (S103). As a result, the optimum torch height hc is maintained (S10).

The fourth aspect is different from the first and the third embodiments in that its advantage is obtainable when the piercing, the torch downward movement, the cutting, the torch upward movement, the torch shifting, the torch downward movement, the cutting, the torch upward movement process steps are continuously performed in a case where there is a plurality of shapes to be formed by the cutting operations in one base metal. That is, the average arc voltage Vb as the subject cutting information is formed by including a predetermined number of times (n−1 times) of the previous information items Vi (the aforesaid arrangement is commonly employed in the fifth aspect of the present invention to be described later).

In a case where the number of times of reading the arc voltages Vi is less than a predetermined times n (that is, the number of times of starting the cutting operations does not reach the predetermined times), the average arc voltage Vb is calculated in such a manner that the arc voltage V1 read at the first time is stored by all of the insufficient times of reading. For example, in a case where the number of reading times is three, the subject arc voltage V1 is stored for the subject reading, the previous voltage V2 is stored for the previous reading, and eight arc voltage V3 before two times are stored from the reading before two times to the reading before nine times. From these read arc voltages, the average arc voltage Vb is calculated. Although a multiplicity of methods may be available, the embodiment of the fifth aspect employs the aforesaid method (however, cutting information according to the fifth aspect of the present invention is V10 in place of the aforesaid information Vi).

FIG. 5(A) is a flow chart for use in the fifth aspect of the present invention. FIGS. 5(B) to 5(D) are graphs for describing the processes shown in FIG. 5(A), where the relationship between the cutting speed F (axis of abscissa) and the arc voltage V (axis of ordinate) at an optimum torch height is shown. The base metal 2 is cut by using the plasma arc 3, and after the arc voltage becomes steady (S6) the arc voltage V01 and the cutting speed F01 corresponding to it are read (S811), the aforesaid arc voltage V01 is obtained from a function V11=g(F) of the aforesaid cutting speed F01 (S812), the reference arc voltage V10 at the time of reference cutting speed F0 individually determined in accordance with the aforesaid function V11 is calculated (S813), as well as each reference arc voltage V10 (i=2 to n) stored for each time retroactively to, for example, the ninth time is read and their average reference arc voltage Vb0 is calculated (S82), furthermore the aforesaid average reference arc voltage Vb0 is calculated as the function V=g(F) which is the function at the time of the aforesaid reference cutting speed F0 (S821), the cutting speed Fa to be realized at the steady cutting operation (S91), the arc voltage in the function V at the aforesaid cutting speed Fa is calculated to obtain the target arc voltage Vc (S92), then the arc voltage Va is read (S93), and this arc voltage Va and the aforesaid target arc voltage Vc are subjected to a comparison (S10). If Va>Vc, the torch is lowered (S101). If Va=Vc, the torch height is retained (S102). If Va<Vc, the torch 1 is moved upwardly (S103). As a result, the optimum torch height hc is maintained (S10).

Figure 8:
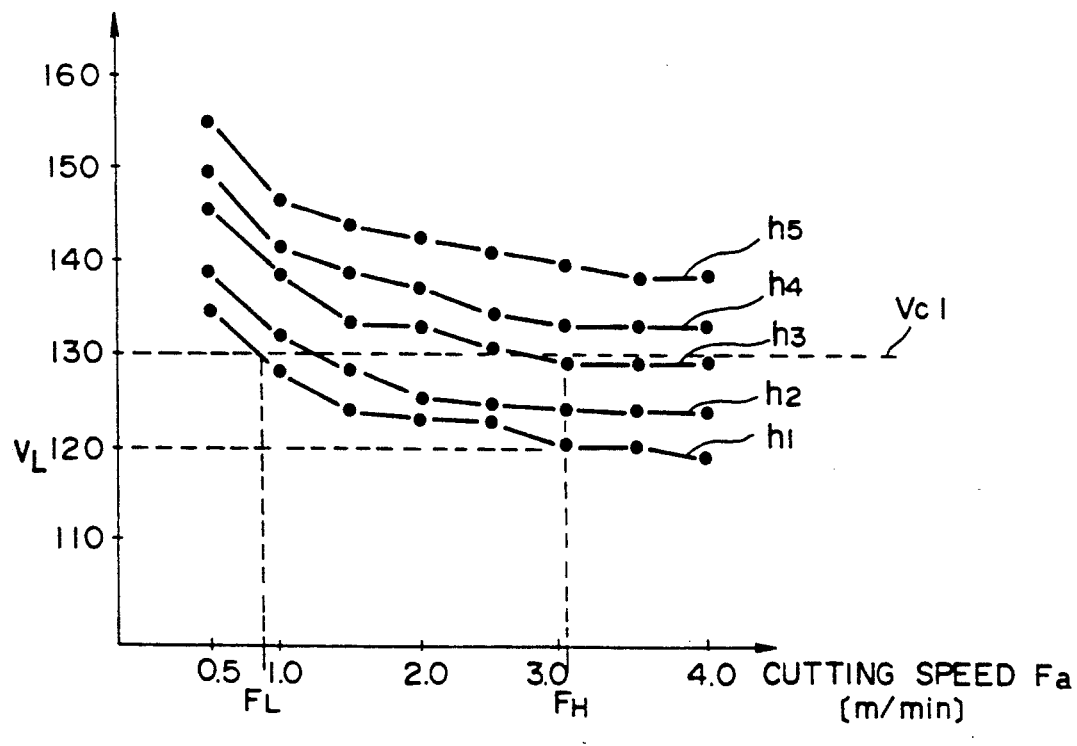
FIG. 8 is a graph which illustrates the relationship between the cutting speed and the arc voltage at a predetermined torch height.

Although the changed voltage ΔV is used in the second to the fourth aspects, the function V11=g(F) is employed in the fifth aspect. Further in detail, the profiles of the graph can be assumed to be the same although they are different from one another in each intercept (that is, the parallel translation can be made in the direction of the axis of ordinate) as can be seen from the foregoing graph shown in FIG. 8. That is, the arc voltage Va is the function of the cutting speed Fa. Incidentally, the necessity for the aforesaid function to be a complicated function such as a multidimensional function can be eliminated. For example, it can be formed by a composite function composed of two or three types of linear functions having different inclinations and by only specifying the cutting speed range to which the aforesaid two or three types of the linear functions are adapted.

Therefore, as shown in FIG. 5(B), in process steps (S811 and S812), the read arc voltage V01 and the cutting speed F01 are used to calculate function V11=g(F) (V01=g(F01)) which includes them. In process step (S813), the reference arc voltage V10=g (F0) at the time of the reference cutting speed F0 calculated individually is calculated in accordance with the aforesaid function V11. This arc voltage V10 is stored until the nine forward cutting operations. The reason why the reference cutting speed F0 is determined lies in the fact that the calculation and storage efficiencies are improved in executing the program by causing the controller 41 to store only basic calculation factors such as the basic function, basic data and the like.

In process step (S82), the average reference arc voltage Vb0 of the reference arc voltage V10 and the reference arc voltages V20 to V90 retroactively stored to the ninth time is calculated. The reason for this lies in that the subject cutting must be made uniform by the dispersion for the forward nine times of the cutting operations. Incidentally, the process of storing the reference arc voltage V10 and that of reading the reference arc voltages V20 to V90 have been described previously in the description about the fourth aspect of the present invention.

In process step (S821), as shown in FIG. 5(C), the average reference arc voltage Vb0 and the reference cutting speed F0 are used to calculate a composite function V=g(F) (Vb0=g(F0)), which includes them, by the same process performed in process steps (S811 and S812).

Step (S92) is a process in which the cutting speed Fa read in process step (S91) is applied to the aforesaid composite function V=g(F) to obtain the target arc voltage Vc=g(Fa). Then, the arc voltage Va read in step (S93) and the target arc voltage Vc are subjected to a comparison in step (S10) so that the torch height is slightly moved in accordance with the result of the comparison.

That is, when the cutting speed Fa is read into the target arc voltage function V corresponding to the optimum torch height hc, the target arc voltage Vc is immediately calculated. Then, when the arc voltage Va is read, the cutting speed Fa is subjected to a comparison with this arc voltage Va. Since Va>Vc as shown in FIG. 5(D), the actual torch height is higher than the optimum torch height hc. Therefore, the optimum torch height hc can be maintained by lowering the torch 1. Hence, an excellent cutting quality which is not affected by the cutting speed Fa can be assuredly realized.

In each embodiment according to the second to the fifth aspects of the present invention, similar results can, of course, be realized even if the arc voltage Va is read (S93) simultaneously with reading the cutting speed Fa (S91).

According to the method of controlling the torch height in plasma cutting which includes the structure for monitoring the cutting speed, the optimum torch height can be maintained even if the cutting speed changes. Therefore, an excellent cutting quality can be maintained.

Another embodiment of the present invention will now be described.

First, the actual arc voltage V generated by the plasma torch 1 and its reference arc voltage V0 to be generated at the time of the reference cutting speed F0 outputted by a reference voltage setter are subjected to a comparison ($V - V010 = \Delta V$). The deviation voltage $\Delta V$ is converted in accordance with a torch height correction reference table previously stored by a correction value converter so as to be outputted as correction command value $\pm \Delta h$ to the robot 5 so that the plasma torch 1 is slightly moved. It should be noted that the robot 5 feeds back change $= \Delta f$ of the reference speed F0 to the reference voltage setter.

Then, linear function V1 is, under predetermined conditions, set in a coordinate system composed of the actual torch heights h (axis of abscissa) and their arc voltages V (axis of ordinate). The predetermined conditions according to this embodiment are as follows: the reference cutting speed F0 is 1.0 m/min, the nozzle diameter $\phi c$ is 0.6 mm, the work material $\rho c$ is a SS material, and the work thickness tc is 3.2 mm. The linear function V1 under the aforesaid conditions can be expressed by the following equation:

$$V_1 = 4.7 \, h + 111$$

Assuming that conditions are not the same, its linear function exhibits similar characteristics in the aforesaid coordinate system although the position and the inclination becomes different to a certain degree.

Then, linear function V2 corresponding to a predetermined work material $\phi c$ is set in the coordinate system composed of the actual cutting speed Fa (axis of abscissa) and the actual arc voltage V (axis of ordinate). Even if the other conditions are changed, the inclination $\alpha$ of the linear function V2 is the same, which is $\alpha = -10$ in this embodiment. However, if the cutting speed Fa exceeds a certain value, the arc voltage V becomes constant, which is, according to this embodiment, 2.0 m/min.

Then, the coordinates of the arc voltage V (which is 120V in this embodiment) of the linear function V1 at the optimum torch height hc (which is 2.0 mm in this embodiment) is made to be the reference voltage in the subject plasma cutting operation.

Finally, in the coordinate system for the linear function V2, linear function Vcc passing through point Pcc the coordinates of which are the reference voltage Vc (120V) and the reference cutting speed F0 (1.0 u/min) and having the inclination $\alpha$ ($-10$) of the aforesaid linear function V2 is set. That is, In a range $0 \leq Fa \leq 2.0$, $\quad V_{cc} = -10 Fa + 130$ If $Fa > 2.0$, $\quad V_{cc} = 110$ Then, the reference voltage Vc which includes the change $\pm \Delta V$ of the arc voltage which corresponds to the change $\pm \Delta f$ from the reference cutting speed F0 is outputted.

According to this embodiment, it can be considered that only the cutting speed is changed the operation of plasma-cutting the same work. Therefore, a reference voltage, which has been corrected by the cutting speed, can be automatically outputted.

INDUSTRIAL APPLICABILITY

The present invention is effective as a method of controlling the torch height in plasma cutting capable of overcoming the problem of the cutting quality due to the change of the cutting speed, and is adapted to plasma welding.

What is claimed is:

1. A method of controlling torch height in plasma cutting, comprising the steps of: setting a plasma torch (1) at an optimum cutting height (hc) from a base metal (2) and generating an arc voltage (Va) between the base metal (2) and an electrode of the plasma torch (1) so that said base metal (2) is cut by the resulting plasma arc (3); reading a value (Vi) of said arc voltage (Va) several times (i=1 to n) after said arc voltage (Va) becomes steady; calculating an average arc voltage (Vb) of the thus read values (Vi) of arc voltage (Va); reading a cutting speed (Fa) at a steady cutting operation; correcting said average arc voltage (Vb) by said cutting speed (Fa) to obtain a target arc voltage (Vc); and maintaining said optimum torch height (hc) by said target arc voltage (Vc).

2. A method of controlling torch height in plasma cutting in which an arc voltage at an optimum cutting height (hc) is set as a target arc voltage (Vc1), a plasma torch (1) is set to said optimum cutting height (hc) from a base metal (2) and an arc voltage (Va) is generated between the base metal (2) and an electrode of the plasma torch (1) so that said base metal (2) is cut by the resulting plasma arc (3), said arc voltage (Va) is read after said arc voltage (Va) becomes steady, and the thus read arc voltage (Va) and said target arc voltage (Vc1) are subjected to a comparison, so that said optimum torch height (hc) is maintained, said method of controlling torch height in plasma cutting comprising the steps of: reading a cutting speed (Fa); and correcting said target arc voltage (Vc1) by a changed voltage ($\Delta V$) which is determined in accordance with said cutting speed (Fa).

3. A method of controlling torch height in plasma cutting, comprising the steps of: setting a plasma torch (1) at an optimum cutting height (hc) from a base metal (2) and generating an arc voltage (Va) between the base metal (2) and an electrode of the plasma torch (1) so that said base metal (2) is cut by the resulting plasma arc (3); reading a value (Vi) of said arc voltage (Va) several times (i=1 to n) after said arc voltage (Va) becomes steady; calculating an average arc voltage (Vb) of the thus read values (Vi) of arc voltage (Va); reading a cutting speed (Fa) at a steady cutting operation; correcting said average arc voltage (Vb) by a changed voltage ($\Delta V$) which is determined in accordance with said cutting speed (Fa) to obtain a target arc voltage (Vc); then reading said arc voltage (Va); subjecting the thus read arc voltage (Va) and said target arc voltage (Vc) to a comparison and, as a result of said comparison:
   (1) lowering said torch (1) if $Va > Vc$;
   (2) retaining the torch height if $Va = Vc$; and
   (3) raising said torch (1) if $Va < Vc$, so that said optimum torch height (hc) is maintained.

4. A method of controlling torch height in plasma cutting, comprising the steps of: setting a plasma torch (1) at an optimum cutting height (hc) from a base metal (2) and generating an arc voltage (Va) between the base metal (2) and an electrode of the plasma torch (1) so that said base metal (2) is cut by the resulting plasma arc (3); reading a value (Vi) of said arc voltage (Va) after said arc voltage (Va) becomes steady; retroactively reading each value (Vi where i=2 to n) of said arc voltage (Va) to $n-1$ times so as to calculate an average arc voltage (Vb) of the thus read values (Vi) of said arc voltage (Va); reading a cutting speed (Fa) at a steady cutting operation; correcting said average arc voltage (Vb) by a changed voltage ($\Delta V$) which is determined in accordance with said cutting speed (Fa) to obtain a target arc voltage (Vc); then reading said arc voltage (Va); subjecting the thus read arc voltage (Va) and said target arc voltage (Vc) to a comparison and, as a result of said comparison;

(1) lowering said torch (1) if $Va > Vc$;
(2) retaining the torch height if $Va = Vc$; and
(3) raising said torch (1) if $Va < Vc$, so that said optimum torch height (hc) is maintained.

5. A method of controlling torch height in plasma cutting, comprising the steps of: setting a plasma torch (1) at an optimum cutting height (hc) from a base metal (2) and generating an arc voltage (Va) between the base metal (2) and an electrode of the plasma torch (1) so that said base metal (2) is cut by the resulting plasma arc (3); reading an arc voltage (V01) and its cutting speed (F01) after said arc voltage (Va) becomes steady; calculating said arc voltage (V01) as a function $V11 = g(F)$ of said cutting speed (F01); calculating a reference arc voltage (V10) to be generated at a reference cutting speed (F0) individually determined in said function (V11); reading each reference arc voltage (V10 where $i = 2$ to n) for each time retroactively stored to the $(n-1)$th time; calculating an average reference arc voltage (Vb0); calculating a function $V = g(F)$, which is a function at said reference cutting speed (F0), in accordance with said average reference arc voltage (Vb0); reading a cutting speed (Fa) at a steady cutting operation; calculating an arc voltage in said function (V) at said cutting speed (Fa) to obtain a target arc voltage (Vc); then reading an arc voltage (Va); subjecting the thus read arc voltage (Va) and said target arc voltage (Vc) to a comparison and, as a result of said comparison;

(1) lowering said torch (1) if $Va > Vc$;
(2) retaining the torch height if $Va = Vc$; and
(3) raising said torch (1) if $Va < Vc$, so that said optimum torch height (hc) is maintained.

6. A method of controlling torch height in plasma cutting according to claim 2, wherein the step of reading said arc voltage (Va) is simultaneously performed with the step of reading said cutting speed (Fa).

7. A method of controlling torch height in plasma cutting according to claim 3, wherein the step of reading said arc voltage (Va) is simultaneously performed with the step of reading said cutting speed (Fa).

8. A method of controlling torch height in plasma cutting according to claim 4, wherein the step of reading said arc voltage (Va) is simultaneously performed with the step of reading said cutting speed (Fa).

9. A method of controlling torch height in plasma cutting according to claim 5, wherein the step of reading said arc voltage (Va) is simultaneously performed with the step of reading said cutting speed (Fa).

* * * * *

UNITED STATES PATENT AND TRADEMARK OFFICE
CERTIFICATE OF CORRECTION

PATENT NO. : 5,288,970
DATED : February 22, 1994
INVENTOR(S) : Yozo NISHI

It is certified that error appears in the above-indentified patent and that said Letters Patent is hereby corrected as shown below:

Column 11, line 21, change "V10" to --$V_{10}$--.

Signed and Sealed this

Fifth Day of July, 1994

Attest:

BRUCE LEHMAN

Attesting Officer     Commissioner of Patents and Trademarks